United States Patent
Hayashi et al.

(10) Patent No.: US 9,512,026 B2
(45) Date of Patent: *Dec. 6, 2016

(54) FLOAT GLASS PLATE AND METHOD OF MANUFACTURING THEREOF

(71) Applicant: Asahi Glass Company, Limited, Chiyoda-ku, Tokyo (JP)

(72) Inventors: Yasuo Hayashi, Tokyo (JP); Satoshi Miyasaka, Tokyo (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/483,856

(22) Filed: Sep. 11, 2014

(65) Prior Publication Data

US 2014/0377529 A1 Dec. 25, 2014

Related U.S. Application Data

(63) Continuation of application No. PCT/JP2013/054608, filed on Feb. 22, 2013.

(30) Foreign Application Priority Data

Mar. 14, 2012 (JP) ................................. 2012-057960

(51) Int. Cl.
*B32B 17/00* (2006.01)
*C03B 13/00* (2006.01)
(Continued)

(52) U.S. Cl.
CPC ............... *C03B 18/02* (2013.01); *C03C 3/091* (2013.01); *C03C 3/093* (2013.01); *Y02P 40/57* (2015.11)

(58) Field of Classification Search
None
See application file for complete search history.

(56) References Cited

U.S. PATENT DOCUMENTS 5,055,122 A 10/1991 Okumura et al.
5,801,109 A 9/1998 Nishizawa et al.
(Continued)

FOREIGN PATENT DOCUMENTS

JP H03-247520 A 11/1991
JP H06-056466 A 3/1994
(Continued)

OTHER PUBLICATIONS

International Search Report received in International Application No. PCT/JP2013/054608 dated May 28, 2013.

*Primary Examiner* — David Sample
*Assistant Examiner* — Nicole T Gugliotta
(74) *Attorney, Agent, or Firm* — Foley & Lardner LLP

(57) ABSTRACT

The present invention relates to a float glass plate that is formed by continuously supplying a molten glass onto a molten metal in a bath and allowing the molten glass to flow on the molten metal, wherein the float glass plate satisfies the following expression (1) when, on a coordinate axis that is parallel to a through-thickness direction and has, as an origin, an arbitrary point on a principal surface which is positioned on the molten metal side in the bath among both principal surfaces of the float glass plate, a water concentration in glass at a coordinate x (μm) indicating a distance from the origin is represented by C(x) (mass ppm), the thickness of the float glass plate is represented by D (μm), a maximum value of the C(x) is represented by Ca (massppm), and a coordinate at which the C(x) is maximum is represented by Da (μm).

[Math. 1]

$$0.5 < \frac{\int_0^{Da}(Ca - C(x))dx}{Ca \times D} \times 100 \leq 2.0 \quad (1)$$

5 Claims, 4 Drawing Sheets

(51) Int. Cl.
*C04B 35/00* (2006.01)
*C03C 3/091* (2006.01)
*C03B 18/02* (2006.01)
*C03C 3/093* (2006.01)

(56) References Cited

U.S. PATENT DOCUMENTS

| | | | |
|---|---|---|---|
| 6,169,047 | B1 | 1/2001 | Nishizawa et al. |
| 2004/0107732 | A1 | 6/2004 | Smith et al. |
| 2004/0110625 | A1 | 6/2004 | Smith et al. |
| 2005/0000248 | A1 | 1/2005 | Lauten-Schlaeger et al. |
| 2007/0037688 | A1 | 2/2007 | Smith et al. |
| 2007/0227190 | A1 | 10/2007 | Smith et al. |
| 2010/0107697 | A1* | 5/2010 | Yamamoto ................ C03B 1/00 65/66 |
| 2011/0251044 | A1 | 10/2011 | Nagai et al. |
| 2012/0208309 | A1 | 8/2012 | Tsujimura et al. |
| 2014/0024517 | A1 | 1/2014 | Hayashi et al. |

FOREIGN PATENT DOCUMENTS

| | | | |
|---|---|---|---|
| JP | H10-072237 A | 3/1998 | |
| JP | 2006-513118 A | 4/2006 | |
| JP | 2006-265001 A | 10/2006 | |
| JP | 2008-050262 A | 3/2008 | |
| JP | 2009-084073 A | 4/2009 | |
| JP | 2010-053032 | 3/2010 | |
| KR | 100754287 B1 | 8/2007 | |
| KR | 1020110103930 A | 9/2011 | |
| KR | 1020140015384 A | 2/2014 | |
| WO | WO-2011/049100 A1 | 4/2011 | |
| WO | WO-2011/052529 A1 | 5/2011 | |
| WO | WO 2012/128261 | * 9/2012 | .............. C03B 18/18 |

* cited by examiner

FLOAT GLASS PLATE AND METHOD OF MANUFACTURING THEREOF

CROSS REFERENCE TO RELATED APPLICATIONS

This application is a continuation application filed under 35 U.S.C. 111(a) claiming the benefit under 35 U.S.C. §§120 and 365(c) of PCT International Application No. PCT/JP2013/054608 filed on Feb. 22, 2013, which is based upon and claims the benefit of priority of Japanese Application No. 2012-057960 filed on Mar. 14, 2012, the entire contents of which are hereby incorporated by reference in their entireties.

TECHNICAL FIELD

The present invention relates to a float glass plate and a method of manufacture thereof.

BACKGROUND ART

A method of manufacture of a float glass plate includes a step of forming molten glass, which is continuously supplied onto molten metal in a bath, into a band plate shape by allowing it to flow on the molten metal (for example, refer to Patent Document 1). The molten glass is cooled while flowing on the molten metal in a predetermined direction and pulled up from the molten metal in the vicinity of an outlet of the bath. The pulled glass is annealed in an annealing furnace and then is cut into a predetermined size and shape to obtain a float glass plate as a product.

CITATION LIST

Patent Literature

Patent Document 1: SP-A-2009-84073

DISCLOSURE OF INVENTION

Technical Problem

The molten glass supplied into the bath is prepared by pouring a powdered glass material into a glass melting furnace. The glass melting furnace includes plural burners that eject flames in an inner space of the glass melting furnace, and the glass material is melted by radiation heat from the flames ejected by each burner.

The burners mix heavy oil with air for combustion to form flames. In recent years, in order to improve a thermal efficiency and reduce $CO_2$ or $NO_x$ emissions, use of natural gas instead of heavy oil and use of oxygen gas instead of air have been examined.

It was found from the result of the examination by the present inventors that, when at least one of natural gas and oxygen gas is used, a large number of defects (concave portions having a diameter of several tens of micrometers to several millimeters) can be formed on a bottom surface (surface in contact with the molten metal in the bath) of a float glass plate.

The present invention has been made in consideration f the above-described problems, and an object thereof is to provide a high-quality float glass plate and a method of manufacture thereof.

Means for Solving the Problems

In order to solve the above-described problems, the float glass plate according to an embodiment of the present invention is
a float glass plate that is formed by continuously supplying a molten glass onto a molten metal in a bath and allowing the molten glass to flow on the molten metal,
in which the float glass plate satisfies the following expression (1) when, on a coordinate axis that is parallel to a through-thickness direction and has, as an origin, an arbitrary point on a principal surface which is positioned on the molten metal side in the bath among both principal surfaces of the float glass plate, a water concentration in glass at a coordinate x (μm) indicating a distance from the origin is represented by C(x) (mass ppm), the thickness of the float glass plate is represented by D (μm), a maximum value of the C(x) is represented by Ca (mass ppm), and a coordinate at which the C(x) is maximum is represented by Da (μm). "The principal surface which is positioned on the molten metal side" described above refers to, among both the principal surfaces of the float glass plate, a principal surface in contact with the molten metal when the principal surface in contact with the molten metal is not polished and refers to a polished surface when the principal surface in contact with the molten metal is polished.

[Math. 1]

$$0.5 < \frac{\int_0^{Da}(Ca-C(x))dx}{Ca \times D} \times 100 \leq 2.0 \quad (1)$$

In the float glass plate according to the present invention, it is preferable that the thickness be 1.1 mm or less, and it is preferable that the maximum value of the water concentration be 470 ppm or more. In addition, the float glass plate according to the present invention preferably contains an alkali-free glass that contains, by mass % in terms of oxides, $SiO_2$: 50 to 66%, $Al_2O_3$: 10.5 to 24%, $B_2O_3$: 0 to 12%, MgO: 0 to 8%, CaO: 0 to 14.5%, SrO: 0 to 24%, BaO: 0 to 13.5%, MgO+CaO+SrO+BaO: 9 to 29.5%, and $ZrO_2$: 0 to 5%; and more preferably contains an alkali-free glass that contains, by mass % in terms of oxides, $SiO_2$: 58 to 66%, $Al_2O_3$: 15 to 22%, $B_2O_3$: 5 to 12%, MgO: 0 to 8%, CaO: 0 to 9%, SrO: 3 to 12.5%, BaO: 0 to 2%, and MgO+CaO+SrO+BaO: 9 to 18%.

In addition, the method of manufacture of a float glass plate according to another embodiment of the present invention is
a method of manufacture of a float glass plate including a forming step that contains continuously supplying a molten glass onto a molten metal in a bath and forming the molten glass into a band plate shape by allowing it to flow on the molten metal,
in which, in the forming step, a water amount eluted from the molten glass to the molten metal is more than 0.5% and 2.0% or less of a water amount in the molten glass immediately before being supplied into the bath.

In the method of manufacture of a float glass plate according to the present invention, it is preferable that the mass of the molten glass supplied into the bath per day be 1.3 times or less of the mass of the molten metal, and it is more preferable that the mass of the molten glass supplied into the bath per day be 0.8 to 1.3 times of the mass of the molten metal. In addition, in the method of manufacture of a float glass plate according to the present invention, it is preferable that the molten glass immediately before being supplied into the bath have a water concentration of 470 mass ppm or more. Further, the float glass plate manufactured by the method of manufacture of a float glass plate according to the present invention preferably has a thickness of 1.1 mm or less, and preferably contains an alkali-free glass that contains, by mass % in terms of oxides, $SiO_2$: 50 to 66%, $Al_2O_3$: 10.5 to 24%, $B_2O_3$: 0 to 12%, MgO: 0 to 8%, CaO: 0 to 14.5%, SrO: 0 to 24%, BaO: 0 to 13.5%, MgO+CaO+SrO+BaO: 9 to 29.5%, and $ZrO_2$: 0 to 5%, and more preferably contains an alkali-free glass that contains, by mass % in terms of oxides, $SiO_2$: 58 to 66%, $Al_2O_3$: 15 to 22%, $B_2O_3$: 5 to 12%, MgO: 0 to 8%, CaO: 0 to 9%, SrO: 3 to 12.5%, BaO: 0 to 2%, and MgO+CaO+SrO+BaO: 9 to 18%.

Effects of Invention

According to the present invention, a high-quality float glass plate and a method of manufacture thereof can be provided.

EMBODIMENTS FOR CARRYING OUT THE INVENTION

Hereinafter, embodiments for carrying out the present invention will be described with reference to the accompanying drawings. In the following drawings, the same or equivalent components are represented by the same or equivalent reference numerals, and the description thereof will be omitted.

Figure 1:
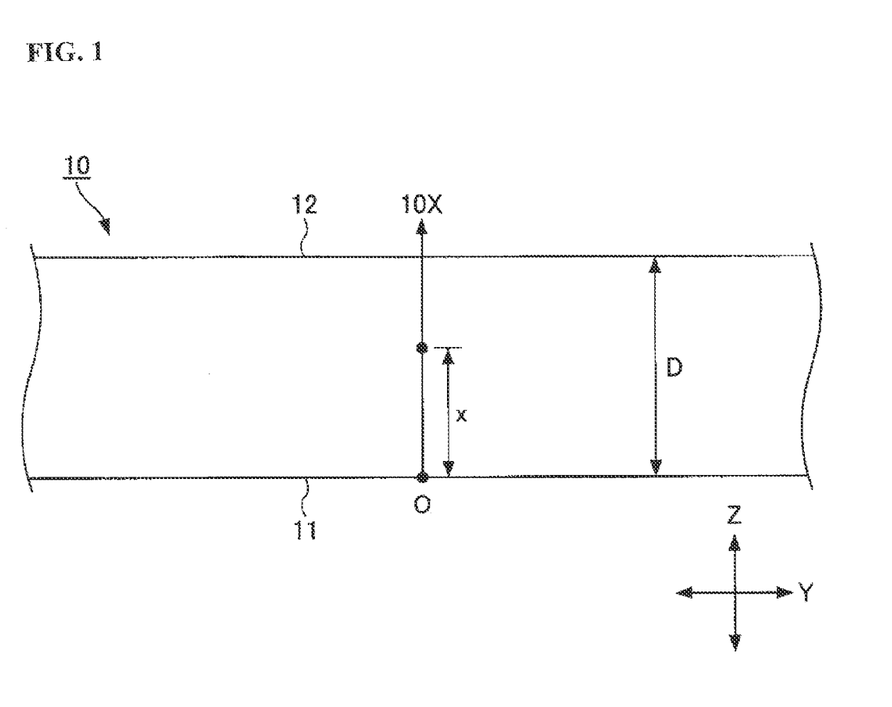
FIG. 1 is a side view of a float glass plate according to an embodiment of the present invention.

FIG. 1 is a side view of a float glass plate according to an embodiment of the present invention.

(Float Glass Plate)

Although will be described below in detail, a float glass plate 10 is formed by continuously supplying molten glass onto molten metal (for example, molten tin) in a bath and allowing the molten glass to flow on the molten metal. The molten glass is cooled while flowing on the molten metal in a predetermined direction and pulled up from the molten metal in the vicinity of an outlet of the bath. The pulled glass is annealed in an annealing furnace and then is cut into a predetermined size and shape to obtain the float glass plate 10 (hereinafter, simply referred to as "glass plate 10") as a product.

The use of the glass plate 10 may be a glass substrate for a flat panel display (FPD) such as a liquid crystal display (LCD), a plasma display (PDP), or an organic EL display. The use of the glass plate 10 may be vehicle window glass or building window glass without particular limitation.

The type of glass of the glass plate 10 is selected according to the use of the glass plate 10. For example, in the case of a glass substrate for FPD, the type of glass of the glass plate 10 may be alkali-free glass. The alkali-free glass is glass that does not substantially contain alkali metal oxides ($Na_2O$, $K_2O$ and $Li_2O$). A total content ($Na_2O+K_2O+Li_2O$) of alkali metal oxides in the alkali-free glass may be, for example, 0.1 mass % or less.

The alkali-free glass contains, for example, by mass % in terms of oxides, $SiO_2$: 50 to 66%, $Al_2O_3$: 10.5 to 24%, $B_2O_3$: 0 to 12%, MgO: 0 to 8%, CaO: 0 to 14.5%, SrO: 0 to 24%, BaO: 0 to 13.5%, MgO+CaO+SrO+BaO: 9 to 29.5%, and $ZrO_2$: 0 to 5%.

It is preferable that the alkali-free glass contain, for example, by mass % in terms of oxides, $SiO_2$: 58 to 66%, $Al_2O_3$: 15 to 22%, $B_2O_3$: 5 to 12%, MgO: 0 to 8%, CaO: 0 to 9%, SrO: 3 to 12.5%, BaO: 0 to 2%, and MgO+CaO+SrO+BaO: 9 to 18%.

The thickness of the glass plate 10 is appropriately set according to the use of the glass plate 10. For example, in the case of the glass substrate for FPD, the thickness of the glass plate 10 is preferably 1.1 mm or less and may be 0.1 to 1.1 mm.

Both principal surfaces of the glass plate 10 are planes which are substantially parallel to each other. One principal surface (principal surface positioned on a lower side in the bath) may be a bottom surface 11 in contact with the molten metal. The other principal surface (principal surface positioned on an upper side in the bath) may be a top surface 12 in contact with an internal atmosphere of the bath.

Neither of the principal surfaces of the glass plate 10 according to the embodiment may be polished, or at least one of the principal surfaces may be polished. In addition, the glass plate 10 may be reheated to be bent after cutting.

The water concentration in the glass plate 10 is substantially uniform in an in-surface direction of the bottom surface 11. On the other hand, in the vicinity of the bottom surface 11, the water concentration in the glass plate 10 decreases toward the bottom surface 11 in a through-thickness direction. This is because, in the bath, water in the molten glass is eluted from the bottom surface 11 side to the molten metal.

At a position (for example, a center portion in the through-thickness direction) sufficiently distant from the bottom surface 11, the water concentration in the glass plate 10 is maximum (fixed), and thus water does not escape. Therefore, a maximum value of the water concentration in the glass plate 10 indicates the water concentration in the molten glass immediately before being supplied into the bath.

In molten glass which is to form a rectangular glass plate having the bottom surface 11 with a size of 1 cm×1 cm and a thickness of D μm, when the water amount (hereinafter, also referred to as "initial amount") immediately before being supplied into the bath is represented by A1 ($10^{-6}$ g), A1 is calculated from the following expression (2) based on the result of measuring a water concentration distribution in the glass plate 10.

[Math. 2]

$$A1 = Ca \times D \times \frac{\rho}{10^4} \quad (2)$$

In the expression (2), D represents the thickness (μm) of the glass plate, Ca represents the maximum value (mass ppm) of the water concentration in the glass plate, and ρ represents the density (g/cm³) of the glass. A method of measuring the maximum value Ca of the water concentration will be described below. In the expression (2), "10⁴" is used to convert the unit of D from "μm" into "cm".

A test specimen for measuring the maximum value Ca of the water concentration is prepared by polishing the bottom surface 11 and the top surface 12 and cutting a portion where the water concentration is maximum (fixed) into a plate shape. The portion where the water concentration is maximum (fixed) is a portion where a count ratio of hydrogen atoms/silicon atoms measured by SIMS described below is maximum (fixed).

The maximum value Ca of the water concentration is calculated from the measurement result of a macro FT-IR (Fourier Transform Infrared Spectrophotometer). First, a maximum value Ea (mm⁻¹) of β-OH which is an index of the water concentration is calculated based on an IR spectrum measured by the macro FT-IR. Ea is calculated from the following expression (3).

[Math. 3]

$$Ea = \frac{10^3}{F} \times \log_{10}\left(\frac{B1}{B2}\right) \quad (3)$$

In the expression (3), F represents the thickness (μm) of the test specimen and, for example, F=500 (μm). In addition, in the expression (3), B1 represents the transmittance (%) of the test specimen at a reference wave number of 4000/cm, and B2 represents the minimum transmittance (%) of the test specimen around a hydroxyl group absorption wave number of 3600/cm. In the expression (3), "10³" is used to convert the unit of F from "μm" into "mm".

Next, Ca is obtained by substituting Ea calculated from the above-described expression (3) into the following expression (4).

[Math. 4]

$$Ca = \frac{Ea}{\varepsilon} \times \frac{G}{\rho} \times 10^4 \quad (4)$$

In the expression (4), G represents the molar mass G=18 (g/mol)) of water, ε represents the molar absorbance coefficient (L/mol·cm) of the glass, and ρ represents the density (g/cm³) of the glass. ε and ρ vary depending on the type of the glass. In the case of alkali-free glass, typically, ε=71 (L/mol·cm) and ρ=2.5 (g/cm³). In the expression (4), "10⁴" is used to convert the unit of Ea from "mm⁻¹" to "cm⁻¹" and is obtained by multiplying "10⁻²" for converting the unit of ε from "L/mol·cm" into "cm²/mol" by "10⁶" for expressing the water concentration Ca by "mass ppm".

In the molten glass which is to form a rectangular glass plate having the bottom surface 11 with a size of 1 cm×1 cm and a thickness of D μm, when the water amount (hereinafter, also referred to as "elution amount") eluted into the molten metal in the bath is represented by A2 (10⁻⁶ g), A2 is calculated from the following expression (5) based on the result of measuring a water concentration distribution in the glass plate.

[Math. 5]

$$A2 = \int_0^{Da} (Ca - C(x)) \frac{\rho}{10^4} dx \quad (5)$$

In the expression (5), x represents a coordinate (μm) indicating a distance from an origin O on a coordinate axis 10x that is parallel to the through-thickness direction and has an arbitrary point on the bottom surface 11 as the origin O, C(x) represents the water concentration (mass ppm) in the glass at the coordinate x, Ca represents a maximum value of C(x), Da represents a value of the coordinate x at which C(x) is maximum, and ρ represents the density (g/cm³) of the glass. x is 0 to Da, and C(x) is a function in which x is a variable. A method of measuring C(x) will be described below. In the expression (5), "10⁴" is used to convert the unit of x from "μm" into "cm".

A test piece for measuring the function C(x) of the water concentration is prepared by cutting a portion positioned at the center of the molten glass in the width direction in the bath. The function C(x) of the water concentration is calculated from a count ratio (hydrogen atoms/silicon atoms) of hydrogen (H) atoms to silicon (Si) atoms in the test piece.

The count ratio (hydrogen atoms/silicon atoms) is measured by SIMS (secondary ion mass spectrometer). Specifically, it is measured by irradiating the bottom surface 11 of the test piece with ion beams and digging the bottom surface 11. For example, a measurement start point is at a position where x=0.01 (μm), and a measurement end point is at a position where x=30.01 (μm). An interval between measurement points is 0.05 μm.

Next, a value H of the count ratio (hydrogen atoms/silicon atoms) at each measurement point is substituted into the following expression (6) to convert into a value E (mm⁻¹) of β-OH. The count ratio (hydrogen atoms/silicon atoms) at each measurement point is smoothened by 10-point moving averaging.

[Math. 6]

$$E = \frac{H}{Ha} \times Ea \quad (6)$$

In the expression (6), Ea represents a maximum value of β-OH and represents a value calculated from the expression (3). Ha represents an average value at the coordinate Da at which the count ratio (hydrogen atoms/silicon atoms) maximum. Ha is measured with the same method as above by polishing the bottom surface to prepare a sample from which a portion with water escaped is removed and irradiating the polished surface of the sample with ion beams. For example, a measurement start point is at a position where x=200 (μm), and a measurement end point is at a position where x=230 (μm). An interval between measurement points is 0.05 μm, and an average value is obtained as a result of 601 times of measurement.

Next, a value E (mm⁻¹) of β-OH calculated from the expression (6) is substituted into the following expression (7) to convert into a value J (mass ppm) of the water concentration.

[Math. 7]

$$J = \frac{E}{\varepsilon} \times \frac{G}{\rho} \times 10^4 \qquad (7)$$

G, $\varepsilon$ and $\rho$ of the expression (7) have the same meanings and values as those of G, $\varepsilon$ and $\rho$ of the expression (4). "$10^4$" is used to convert the unit of E from "$mm^{-1}$" to "$cm^{-1}$" and is obtained by multiplying "$10^{-2}$" for converting the unit of $\varepsilon$ from "L/mol·cm" into "$cm^2$/mol" by "$10^6$" for expressing the water concentration J by "mass ppm".

Figure 2:
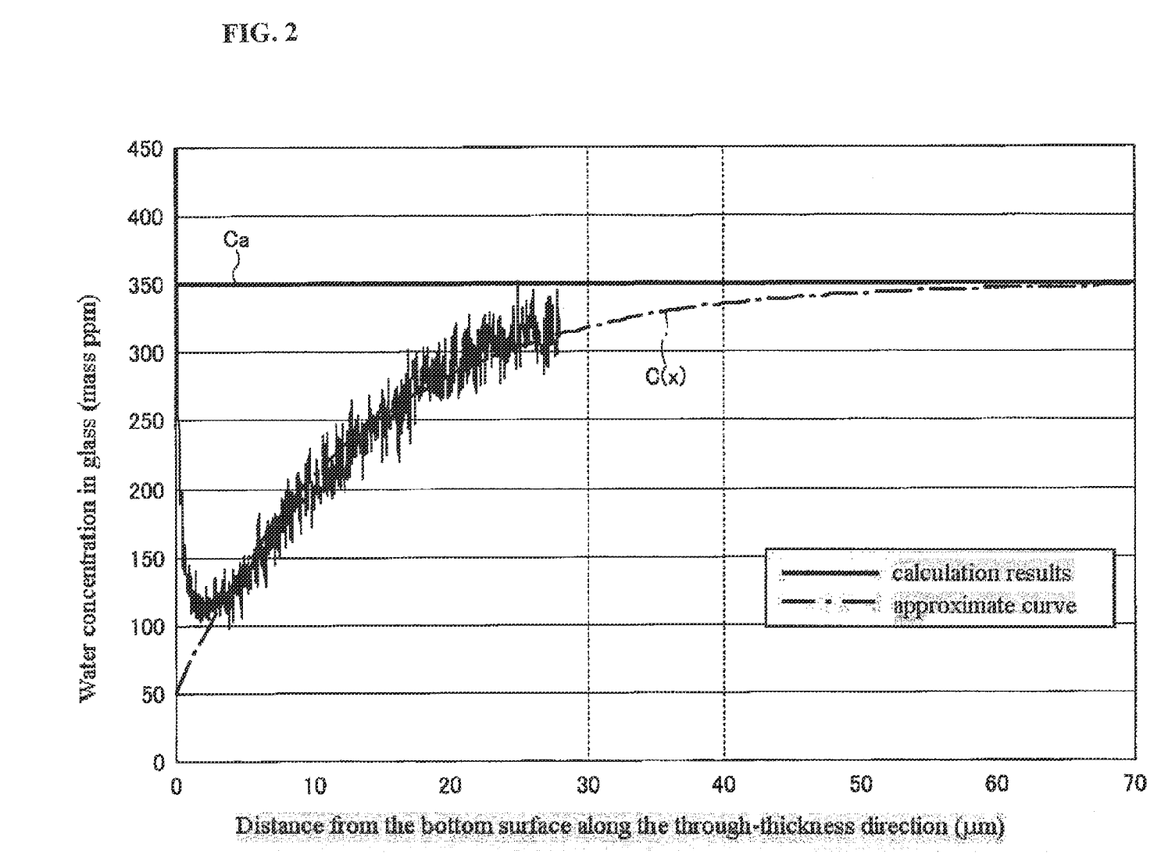
FIG. 2 is a diagram illustrating a distribution example of the water concentration in glass which is calculated from a measurement result of SIMS.

FIG. 2 is a diagram illustrating a distribution example of the water concentration in glass which is calculated from a measurement result of SIMS. In FIG. 2, a line (solid line) obtained by connecting the calculation results of the water concentration and an approximate curve (chain line) of the water concentration are plotted, respectively.

It can be seen from FIG. 2 that, in a region (x≥3) distant from the bottom surface 11 by 3 μm or more, the water concentration decreases toward the bottom surface 11, and thus water in the test piece is eluted from the bottom surface 11 to the molten metal. However, in a region (x<3) distant from the bottom surface 11 by less than 3 μm, the water concentration increases toward the bottom surface 11. The reason is presumed as follows. Protons (hydrogen ions) separated from water vapor in an annealing furnace are attached on the bottom surface 11, and the attached protons exchange ions with sodium (Na) ions in the glass. The water concentration at each measurement point distant from the bottom surface 11 by less than 3 μm (x<3) is regarded as being inappropriate as a value indicating a change of the water amount in the glass caused by the contact with the molten metal and thus is excluded from the following process.

Next, a variable parameter in the following expression (8) is obtained using a least-square method to calculate the function C(x) of the water concentration such that an error between a water concentration distribution calculated from the measurement result of SIMS and the following expression (8) which is a model formula of the concentration distribution. Calculation points of the water concentration used for this approximation are plural and are arranged at an interval of 0.5 μm from the origin O (refer to FIG. 1) (in this case, calculation points distant from the origin O (refer to FIG. 1) by less than 3 μm are excluded).

[Math. 8]

$$C(x) = Ca - K \times \exp(-L \times x) \qquad (8)$$

In the expression (8), Ca represents the maximum value of the water concentration and represents the value calculated from the expression (4). K and L are variable parameters. In the approximate curve shown in FIG. 2, K=300 (mass ppm) and L=0.075 ($\mu m^{-1}$).

In this way, after determining C(x) and Ca, the elution amount A2 is calculated by performing integration using sectional measurement based on the following expression (9).

[Math. 9]

$$\int_0^{Da} (Ca - C(x))dx = \sum_{i=0}^{n} \{(Ca - Ci) \times M\} \qquad (9)$$

In the expression (9), Da represents a value (μm) of x at which C(x) is maximum, i represents an integer of 1 to n, n represents the number of divided sections (x=0 to x=Da), M represents the width (M=Da/in) (for example, 0.5 (μm)) of each divided section, and Ci represents C(x) at which x=i×M.

In the embodiment, as the test piece for SIMS, one having a non-polished bottom surface 11 is used, but polished one may be used. When the polishing amount is 1 μm or less, an effect by polishing is negligible. Therefore, the water concentration can be obtained as described above. In this case, the origin is an arbitrary point on the principal surface (that is, the surface obtained by polishing the bottom surface 11) which is positioned on the lower side in the bath among both the principal surfaces of the glass plate.

In addition, in the embodiment, as the test piece for SIMS, one having a non-polished top surface 12 is used, but polished one may be used. When the polishing amount is 1 μm or less, an effect of changing the thickness due to polishing is negligible. Therefore, the water concentration can be obtained as described above.

In the glass plate according to the embodiment, a ratio A (A=A2/A1×100) of the elution amount A2 to the initial amount A1 is more than 0.5 to 2(%). The ratio A is calculated from the following expression (10).

[Math. 10]

$$A = \frac{A2}{A1} \times 100 = \frac{\int_0^{Da} (Ca - C(x))dx}{Ca \times D} \times 100 \qquad (10)$$

A glass plate where the ratio A is 2(%) or less, although will be described below in detail, has little defects on the bottom surface 11 and thus is excellent in the quality and the manufacturing cost. In addition, a glass plate where the ratio A is more than 0.5(%), is excellent in the productivity. These effects are clearly exhibited in a method of manufacture described below. The ratio A is preferably more than 0.5 to 1.6 (%) and more preferably more than 0.5 to 1.4(%). A preferable range of the maximum value Ca of the water concentration, a preferable range of the thickness, and the like will be described below.

(Method of Manufacture of Glass Plate)

Figure 3:
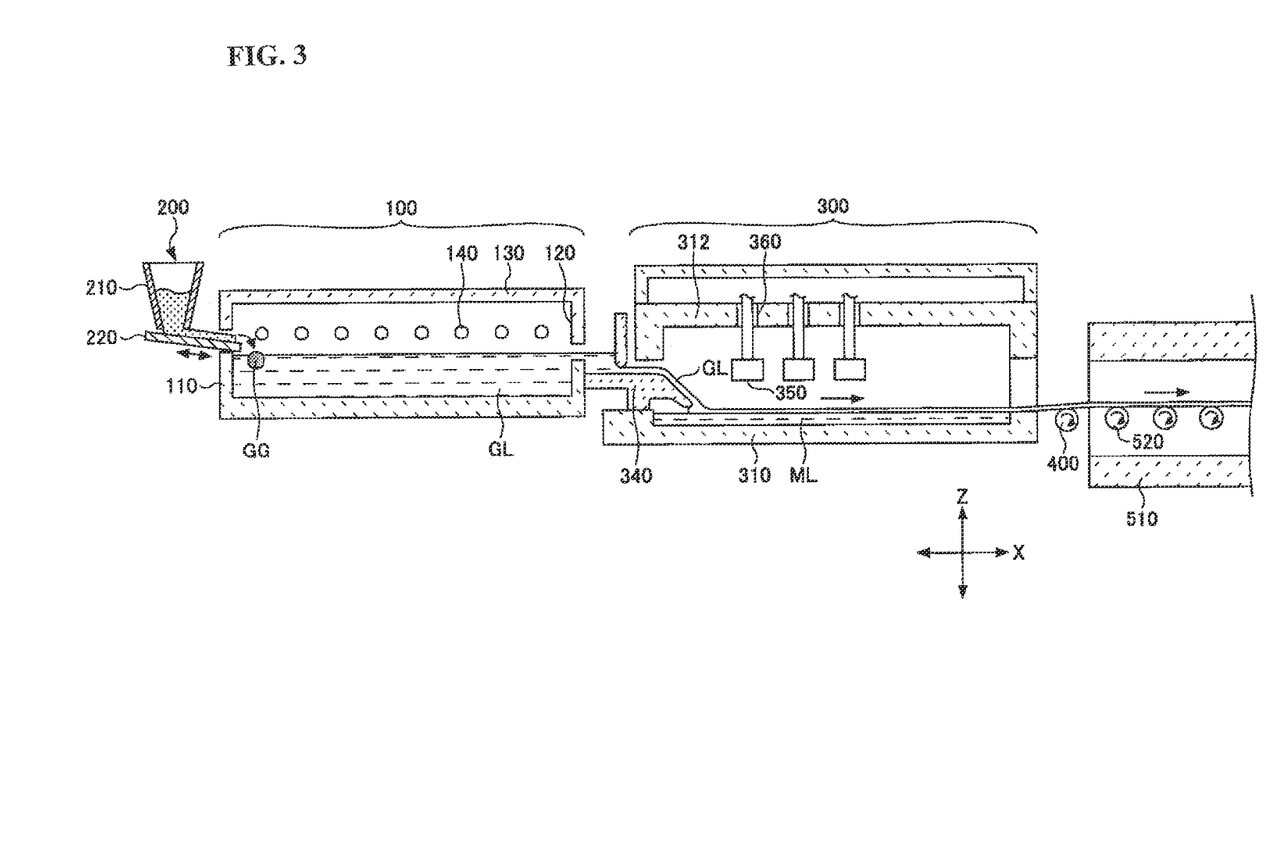
FIG. 3 is a diagram of a method of manufacture of a glass plate according to an embodiment of the present invention.
Figure 4:
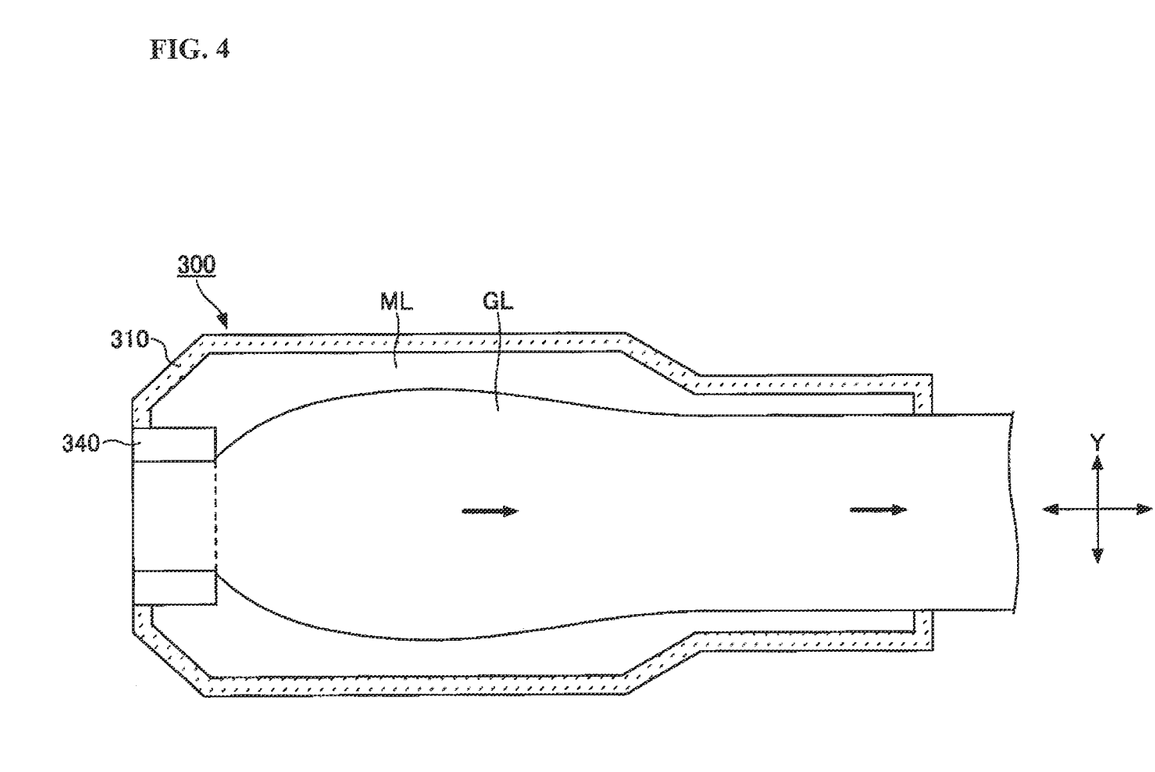
FIG. 4 is a top view illustrating an example of an internal structure of a forming apparatus.

FIG. 3 is a diagram of a method of manufacture of a glass plate according to an embodiment of the present invention. FIG. 4 is a top view illustrating an example of an internal structure of a forming apparatus. In FIG. 3 and FIG. 4, X direction, Y direction and Z direction represent a longitudinal direction (a direction parallel to a flowing direction), a width direction, and an up-down direction (vertical direction) of the molten glass which is to form the float glass plate, respectively in the bath. The X direction, Y direction and Z direction are perpendicular to each other.

The method of manufacture of a glass plate includes a melting step of melting, for example, a powdered glass material GG to prepare molten glass GL, a forming step of forming the molten glass GL into a band plate shape, and an annealing step of annealing the formed glass. The annealed glass is cut into a predetermined size to obtain the glass plate 10 illustrated in FIG. 1.

In the melting step, the powdered glass material GG is poured into a glass melting furnace 100. A pouring machine 200 is provided adjacent to the glass melting furnace 100. In the pouring machine 200, the glass material GG poured from the inside of a hopper 210 is poured into the glass melting furnace 100 by a feeder 220.

The glass melting furnace 100 includes a melting tank 110 that accommodates the molten glass GL, a ring-shaped upper side wall 120 that is disposed above the melting tank 110, and a ceiling 130 that covers the upper side wall 120 from above. The glass melting furnace 100 includes plural burners 140.

The burners 140 are provided plurally at a pair of left and right side wall portions of the upper side wall 120 at intervals in a predetermined direction and form flames in an internal space of the glass melting furnace 100. The burners 140 mix natural gas with oxygen gas for combustion to form flames. The glass material GG is melted by radiation heat from the flames to obtain the molten glass GL.

The burners according to the embodiment mix natural gas with oxygen gas for combustion to form flames, but the flames only have to be formed using at least one of natural gas and oxygen gas. Heavy oil may be used instead of natural gas, or air may be used instead of oxygen gas.

In the forming step, the molten glass GL in the melting tank 110 is introduced into a forming apparatus 300 to be formed. In the forming apparatus 300, the molten glass GL which is supplied onto the molten metal (for example, molten tin) ML accommodated in the bath 310 flows on the molten metal ML to be formed into a band plate shape. The molten glass GL is cooled while flowing on the molten metal ML in a predetermined direction, is pulled up from the molten metal ML by a lift-out roll 400 provided in the vicinity of an outlet of the bath 310, and is transported to an annealing furnace 510. The details of the forming step will be described below.

In the annealing step, the glass formed in the bath 310 is annealed in the annealing furnace 510. In the annealing furnace 510, the glass is annealed while being horizontally transported on a transport roller 520. The glass transported from the annealing furnace 510 is cut into a predetermined size to obtain the glass plate 10 illustrated in FIG. 1.

Next, the forming apparatus used in the forming step will be described in detail with reference to FIG. 3 and FIG. 4.

The forming apparatus 300 includes a spout lip 340, plural heaters 350, and a gas supply passage 360. The spout lip 340 is a supply passage for supplying the molten glass GL in the glass melting furnace 100 to the bath 310.

The plural heaters 350 heats the inside of the bath 310 and, for example, as illustrated in FIG. 3, are suspended from a ceiling 312 of the bath 310. The plural heaters 350 adjust a temperature distribution of the molten metal ML or the molten glass GL in the bath 310.

The gas supply passage 360 supplies reducing gas into the bath 310 to prevent the molten metal ML from being oxidized, which supplies, for example, reducing gas into the bath 310 via holes for the heaters 350 formed in the ceiling 312 of the bath 310. The reducing gas is composed of nitrogen gas ($N_2$), hydrogen gas ($H_2$), or the like. The concentration of hydrogen gas is preferably 15 vol % or less. The hydrogen concentration in an internal atmosphere of the bath 310 can be adjusted using an on-off valve or the like of a nitrogen gas source or a hydrogen gas source connected to the gas supply passage 360.

In the embodiment, at least one of natural gas and oxygen gas is used to form flames in the glass melting furnace 100. Therefore, compared to a case of the related art where heavy oil or air is used, the water concentration in the internal atmosphere of the glass melting furnace 100 increases. Therefore, the water concentration in the molten glass GL in the glass melting furnace 100 increases. As a result, water is likely to be eluted from the molten glass GL to the molten metal ML in the bath 310.

In the bath 310, water eluted from the molten glass GL to the molten metal ML is dissolved in the molten metal ML in the form of hydrogen, oxygen, water, and the like to increase the actual concentration of gas components (for example, dissolved hydrogen or dissolved oxygen) dissolved in the molten metal ML.

The saturation concentration of the gas components dissolved in the molten metal ML is determined based on the temperature of the molten metal ML. As the temperature of the molten metal ML decreases, the saturation concentration decreases. In the bath 310, the saturation concentration is high in an upstream region where the temperature is high, and the saturation concentration is low in a midstream or downstream region where the temperature is low.

When the actual concentration of the gas components dissolved in the molten metal ML in the upstream region is less than or equal to the saturation concentration of the gas components dissolved in the molten metal ML in the midstream or downstream region, the supersaturated precipitation of gas can be suppressed while the molten metal ML flows along with the molten glass GL. As a result, the amount of bubbles included in the molten metal ML can be reduced, and the attachment of bubbles on a lower surface of the molten glass GL can be suppressed. Therefore, defects (concave portions having a diameter of several tens of micrometers to several millimeters) on the bottom surface 11 of the glass plate 10 can be reduced.

The actual concentration of the gas components dissolved in the molten metal ML in the upstream region is determined based on (1) the ratio A ($A=A2/A1\times100$) of the elution amount A2 to the initial amount A1, (2) the ratio (W1/W2) of the mass W1 of the molten glass GL which is supplied into the bath 310 per day to the mass W2 of the molten metal ML, and the like. As the ratio A decreases and W1/W2 decreases, the actual concentration of the gas components dissolved in the molten metal ML in the upstream region decreases. Accordingly, as W1/W2 decreases, the upper limit of the ratio A for obtaining the glass plate 10 having high quality bottom surface 11 increases. The mass W2 of the molten metal ML is substantially fixed irrespective of time.

W1/W2 is, for example, set according to the thickness or the type of the glass plate 10. When the line speed of a manufacturing line Of the glass plate 10 is the same (that is, when the flow rate of the molten glass GL, in the bath 310 is the same), as the thickness of the glass plate 10 decreases, W1 is set to be low, Therefore, when W2 is fixed, W1/W2 is set to be low. For example, when the thickness of the glass plate 10 is 1.1 mm or less, it is preferable that W1/W2 be 1.3 or less. During the production of glass, the operation is likely to be performed such that the production amount further increases. Therefore, in the case of W1/W2, the precise control of the upper limit is more important than the precise control of the lower limit. Of course, it is more preferable that W1/W2 be set to be 0.8 to 1.3.

The lower limit of the ratio A is, for example, set according to the thickness of the glass plate 10. As the thickness of the glass plate 10 decreases, a distance between the bottom surface 11 and the top surface 12 is narrow. Therefore, water is likely to be eluted and the ratio A is likely to increase. When the thickness is 1.1 mm or less, the glass plate 10 can be easily manufactured by setting the ratio A to be more than 0.5%.

When W1/W2 is 0.8 to 1.3, the ratio A is set to be 2.0(%) or less. As a result, the glass plate 10 having high quality bottom surface 11 is obtained. When W1/W2 is 0.8 to 1.3, the ratio A is preferably 1.6(%) or less and more preferably 1.4 (A) or less.

As the initial amount A1 increases, the effect (the effect of obtaining the glass plate having high quality bottom surface) obtained by the present invention is significant, because the elution amount A2 increases and thus defects are likely to be generated. Accordingly, the present invention is preferably applicable to the case where the maximum value Ca of the water concentration which is an index of the initial amount A1 is 470 (mass ppm) or more and is particularly preferably applicable to the case of 490 (mass ppm) or more. In addition, when β-OH is used instead of the water concentration, in the case of alkali-free glass, it is preferably applicable to the case where the maximum value Ea of β-OH is 0.38 ($mm^{-1}$) or more and is particularly preferably applicable to the case of 0.39 ($mm^{-1}$) or more. When the burners of the melting furnace use natural gas instead of heavy oil or when the burners of the melting furnace use oxygen gas instead of air, Ca is 470 (mass ppm) or more, and Ea is 0.38 ($mm_{-1}$) or more. In addition, when the burners of the melting furnace mix natural gas with oxygen for combustion to form flames, Ca is 490 (mass ppm) or more, and Ea is 0.39 ($mm^{-1}$) or more.

The mass W1 of the molten glass GL supplied into the bath 310 per day is preferably adjusted such that the ratio A is in the above-described range. When the glass plate 10 having the same thickness is manufactured, as the mass W1 increases, the flow rate of the molten glass GL is set to be high, and the time period in which the molten glass GL stays in the bath 310 decreases and the elution amount A2 decreases. The flow rate of the molten glass GL may be adjusted instead of (or while) adjusting the mass W1 such that the ratio A is in the above-described range.

In addition, temperature control of the molten metal ML or the temperature control of the molten glass GL may be conducted such that the ratio A is in the above-described range. It is efficient to conduct these temperature controls in the upstream region in the bath 310. This is because the amount of gas supersaturated and precipitated in the midstream or downstream region is determined depending on the actual concentration of the gas components dissolved in the molten metal ML in the upstream region. "The upstream region" described here refers to all the regions which are positioned on the upstream side of a position distant from a tip end (downstream end) of the spout lip 340 in the flowing direction (X direction) of the molten glass GL by 160 inch (corresponding to 406 cm).

As the temperature of the molten metal ML in the upstream region decreases, the saturation concentration in the upstream region decreases and the elution speed of water decreases. Therefore, the elution of water from the molten glass GL to the molten metal ML is restricted and the elution amount A2 is reduced. Likewise, as the temperature of the molten glass GL in the upstream region decreases, the elution speed of water decreases. Therefore, the elution of water from the molten glass GL to the molten metal ML is restricted and the elution amount A2 is reduced.

The temperature of the molten metal ML or the temperature of the molten glass GL in the upstream region can be adjusted using, for example, the burners 140 provided in the glass melting furnace 100, a not-illustrated heater provided around the spout lip 340, and the heaters 350 provided in the bath 310. In addition, the temperatures can be adjusted by providing a coolant (cooler) in the upstream region.

The temperature of the molten metal ML or the temperature of the molten glass GL in the upstream region is, for example, 800 to 1300° C.

Further, the hydrogen gas concentration in an internal atmosphere of the bath 310 may be adjusted such that the ratio A is in the above-described range. It is efficient to perform this adjustment in the upstream region in the bath 310.

For example, in the upstream region, as the hydrogen gas concentration in the atmosphere increases, the amount of dissolved hydrogen gas in the molten metal ML increases. Therefore, the elution of water from the molten glass GL into the molten metal ML is restricted, and the elution amount A2 is reduced.

The hydrogen gas concentration in the atmosphere in the upstream region is set according to the type of glass, the thickness, or the like of the glass plate 10. For example, in the case of alkali-free glass, it is preferably 5 vol % or more and more preferably 10 vol % or more. From the viewpoint of cost, it may be 15 vol % or less.

The hydrogen concentration in the atmosphere in the upstream region can be adjusted using an on-off valve or the like of a nitrogen gas source or a hydrogen gas source connected to the gas supply passage 360.

Further, an additive may be added to the molten metal ML such that the ratio A is in the above-described range and the adjustment method is not particularly limited.

Hereinabove, the embodiments of the present invention have been described, but the present invention is not limited to the above-described embodiments. Within a range not departing from the scope of the present invention, various modifications and substations can be added to the above-described embodiments.

For example, in the above-described embodiments, in order to measure the water concentration distribution in the glass plate, SIMS is used. However, when a range of x≥30 is measured, a micro FT-IR which has lower resolving power than that of SIMS and higher resolving power than that of macro FT-IR may be used.

EXAMPLES

Hereinafter, the present invention will be described in detail using Examples or the like, but the present invention is not limited to these examples.

Examples 1 to 9

In Examples 1 to 9, molten glass was continuously supplied to molten tin, and the molten glass was allowed to flow on the molten tin to prepare a glass plate having a thickness of 0.7 mm. The glass plate is formed of alkali-free glass and contains, by mass % in terms of oxides, $SiO_2$: 60%, $Al_2O_3$: 17%, $B_2O_3$: 8%, MgO: 3%, CaO: 4%, SrO: 8%, and MgO+CaO+SrO+BaO: 15%. The chemical composition of the glass plate was measured using an X-ray fluorescence spectrometer (ZSX100e, manufactured by Rigaku Corporation), In Examples 1 to 9, float glass plates were prepared while changing conditions such as the temperature of the molten glass and the temperature of the molten tin in an upstream region in a bath. Examples 1 to 8 are examples according to the present invention, and Example 9 is a comparative example.

The water concentration in the glass plate was measured using the following device and measurement conditions.

(Macro FT-IR)
Device: FT-IR-8400, manufactured by Shimadzu Corporation
Number of times of scanning 70 times Spectral resolving power: 4 cm$^{-1}$
(SIMS)
Device: ADEPT1010, manufactured by Ulvac-Phi Inc.
Detection of primary ion Cs$^+$ and negative ion
Acceleration voltage: 5 kV
Beam current: 1 μA
Raster size: 200×200 μm
Angle of test piece: 60°

Based on these measurement results, the ratio A (%) of the elution amount A2 to the initial amount A1 and the like were calculated according to the above-described expressions (2) to (10).

Whether or not there were defects (concave portions having a short diameter of 1.5 mm or more) on a bottom surface of the glass plate was determined by visual inspection.

The evaluation results are shown in Table 1 along with the forming conditions of the glass plates.

TABLE 1

|  | W1/W2 | A2/A1 × 100 | Ca (mass ppm) | Ea (mm$^{-1}$) | Presence/Absence of defects |
| --- | --- | --- | --- | --- | --- |
| Example 1 | 1.0 | 1.0 | 556 | 0.455 | None |
| Example 2 | 1.2 | 1.1 | 350 | 0.281 | None |
| Example 3 | 0.8 | 2.0 | 601 | 0.483 | None |
| Example 4 | 1.0 | 1.4 | 406 | 0.326 | None |
| Example 5 | 1.1 | 1.2 | 369 | 0.296 | None |
| Example 6 | 1.3 | 1.1 | 296 | 0.238 | None |
| Example 7 | 1.1 | 1.2 | 329 | 0.264 | None |
| Example 8 | 1.0 | 1.5 | 350 | 0.281 | None |
| Example 9 | 0.7 | 2.2 | 601 | 0.483 | Present |

It can be seen from Table 1 that, in the glass where the range of W1/W2 is 0.8 to 1.3, the defects can be suppressed when the elution amount ratio (A2/A1×100) is suppressed to be 2.0% or less by optimizing the conditions such as the temperature of the molten glass in the upstream region in the bath.

The present invention has been described in detail with reference to the specific embodiments. However, it is obvious to those skilled in the art that various modifications and alternations can be added thereto within a range not departing from the spirit and the scope of the present invention.

This application is based on Japanese Patent Application No. 2012-057960, filed on Mar. 14, 2012 and the entire contents of which are incorporated herein by reference.

DESCRIPTION OF REFERENCE SIGNS

10 Float glass plate
11 Bottom Surface
12 Top surface
310 Bath
ML Molten Metal
GL Molten glass

The invention claimed is:

1. A float glass plate that is formed by continuously supplying a molten glass onto a molten metal in a bath and allowing the molten glass to flow on the molten metal,
wherein the float glass plate satisfies the following expression (1) when, on a coordinate axis that is parallel to a through-thickness direction and has, as an origin, an arbitrary point on a principal surface which is positioned on the molten metal side in the bath among both principal surfaces of the float glass plate, a water concentration in glass at a coordinate x (μm) indicating a distance from the origin is represented by C(x) (mass ppm), the thickness of the float glass plate is represented by D (μm), a maximum value of the C(x) is represented by Ca (mass ppm), and a coordinate at which the C(x) is maximum is represented by Da (μm)

[Math. 1]

$$0.5 < \frac{\int_0^{Da}(Ca - C(x))dx}{Ca \times D} \times 100 \leq 2.0. \quad (1)$$

2. The float glass plate according to claim 1, wherein the thickness is 1.1 mm or less.

3. The float glass plate according to claim 1, wherein the maximum value of the water concentration is 470 mass ppm or more.

4. The float glass plate according to claim 1, which comprises an alkali-free glass that contains, by mass % in terms of oxides,
SiO$_2$: 50 to 66%,
Al$_2$O$_3$: 10.5 to 24%,
B$_2$O$_3$: 0 to 12%,
MgO: 0 to 8%,
CaO: 0 to 14.5%,
SrO: 0 to 24%,
BaO: 0 to 13.5%,
MgO+CaO+SrO+BaO: 9 to 29.5%, and
ZrO$_2$: 0 to 5%.

5. The float glass plate according to claim 4, which comprises an alkali-free glass that contains, by mass % in terms of oxides,
SiO$_2$: 58 to 66%,
Al$_2$O$_3$: 15 to 22%,
B$_2$O$_3$: 5 to 12%,
MgO: 0 to 8%,
CaO: 0 to 9%,
SrO: 3 to 12.5%,
BaO: 0 to 2%, and
MgO+CaO+SrO+BaO: 9 to 18%.

* * * * *